Sept. 11, 1951           G. J. SIEZEN           2,567,656
TRANSLUCENT PROJECTION SCREEN FOR VIEWING
FROM TWO DIFFERENT DIRECTIONS
Filed Aug. 4, 1948
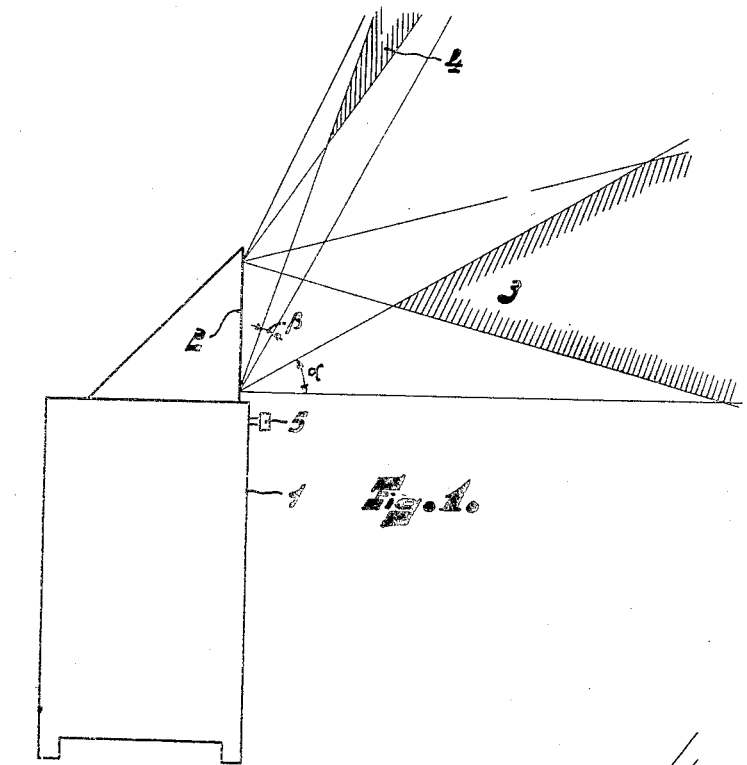
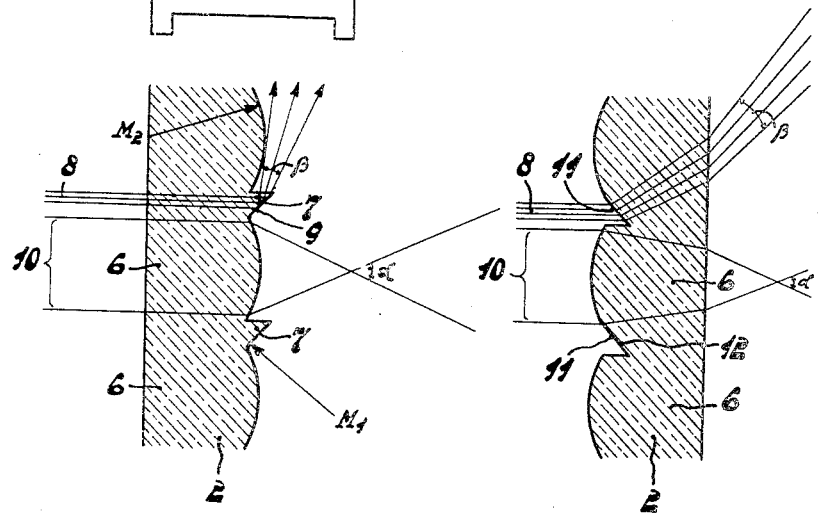
GERRIT JAN SIEZEN
INVENTOR
BY *Fred M Vogel*
AGENT Patented Sept. 11, 1951

2,567,656

UNITED STATES PATENT OFFICE 2,567,656

TRANSLUCENT PROJECTION SCREEN FOR VIEWING FROM TWO DIFFERENT DIRECTIONS

Gerrit Jan Siezen, Eindhoven, Netherlands, assignor to Hartford National Bank and Trust Company, Hartford, Conn., as trustee Application August 4, 1948, Serial No. 42,378
In the Netherlands August 14, 1947

5 Claims. (Cl. 88—28.93)

The invention relates to an arrangement for visualization of an image on a screen, more particularly a television receiver, and to a screen for use in such an arrangement.

In order to ensure optimum visibility of the picture produced by such an arrangement, it is common practice to construct the arrangement and the screen in such manner that the luminous flux issuing from such a screen forms a single beam which fills a solid angle which is as small as is permissible in view of the arrangement of the spectators; outside this solid angle the picture is not sufficiently visible or not visible at all.

This results in comparatively difficult focussing of the picture on the screen. When the operator is so positioned that he can readily reach the control-knobs of the apparatus, his head will, as a rule, be outside the beam of the picture.

The use of the invention permits of obviating this disadvantage.

According to the invention, the light radiated by the screen forms two beams and this readily permits of choosing the beams to be such that the one furnishes a readily visible picture in the spectators' space, whereas the other is directed towards the position occupied by the operator.

In order that the invention may be more clearly understood and readily carried into effect, it will now be described more fully with reference to the accompanying drawing, which shows some embodiments, by way of example.

The one beam preferably contains more than half the luminous flux radiated by the screen and the second beam less than half the luminous flux of the first beam, whilst the solid angle which is filled by the first beam exceeds double the solid angle filled by the second beam and it is desirable that the axis of the second beam should be at an angle of not more than 70° with the surface of the screen.

The invention also relates to a projection screen for use in such an arrangement.

Fig. 1 diagrammatically illustrates the light distribution of a projection arrangement according to the invention.

Figs. 2 and 3 are sectional views of projection screens according to the invention.

The projection arrangement shown in Fig. 1 comprises a cabinet 1 provided with a projection screen 2.

As illustrated by two embodiments shown, by way of example, in the other figures the said screen is shaped in such manner that the light projected on to any area of the screen is dissipated in two directions, to wit in a beam designated $\alpha$ and in a beam designated $\beta$.

The luminous flux constituted by the various beams $\alpha$ is combined to form a beam which is directed towards the spectators' space, in the hatched part 3 of which the entire picture will be clearly visible.

Apart therefrom, the beams $\beta$ form a second beam, which fills a space 4, whence the picture may also be viewed distinctly. This space is very narrow and situated so as to permit of the person observing the picture on the screen from this space readily reaching the control-knobs of the apparatus, which knobs may be, for example, at 5.

A screen which produces such a light distribution may have a sectional area as shown in Figs. 2 and 3. The screen shown in Fig. 2 comprises cylindrical lens-like parts 6 which are interconnected by narrow ribs 7 which in section are substantially triangular. A light beam 8 extending through the screen on to these ribs is totally reflected by the slope 9 of the ribs 7 and thus forms a beam $\beta$. This beam may be given a small spread by making the surface 9 slightly concave, for example, by shaping it into the form of a cylindrical surface having an axis at $M_1$. A further light beam 10 is directed on to a cylindrical lens-like part 6, so that a diverging beam $\alpha$ is formed. The axis of the spherical surface of the parts 6 may be located at $M_2$.

The angle which the axis of the beam 3 constituted by the various beams $\alpha$ forms with the surface of the screen preferably exceeds 70°, whereas the axis of the beam 4 formed by the beams $\beta$ is preferably inclined at an angle of less than 70°.

The operation of the screen shown in sectional view in Fig. 3 is substantially similar, the beam 8 impinging on a sharp slot 11 which exhibits a concave, cylindrical surface 12, so that a beam $\beta$ is formed.

Since the total luminous flux required for focussing the device is only small, it is desirable that the total luminous flux of the beams 8 and $\beta$ should form only a small part of the luminous flux of the beams 10. This result may be obtained by choosing the surfaces of the parts 7 and 11, which are struck by the beams 8, so as to be small and shaping them such that the space filled up by the beams $\beta$ is but small both in the section taken on the plane of the drawing of Fig. 1 and in the section at right angles thereto. The parts 7 and 11 need not form continuous slots, they may be shaped into the form of small extensions or indents.

The screen may be made of transparent or of light-diffusing material if it is desired to use it as a viewing screen, or, as an alternative, it may be rendered reflecting or reflective in a diffuse manner and provided with facets such that the light distribution aimed at by the invention is ensured.

What I claim is:

1. A viewing screen for a cathode-ray tube projection television apparatus wherein the control members of the apparatus are positioned adjacent the screen on a cabinet housing the apparatus, said screen being constituted by a light permeable surface for transmitting light rays originating from the cathode-ray tube within the cabinet to an operator manipulating the control members on the cabinet as well as to spectators remote from the cabinet, said screen surface comprising a first series of separate lens-shaped means and a second series of lens-shaped means arranged alternately with respect to the first series, said first series of lens-shaped means being dimensioned and commonly directed to transmit a first image beam containing more than half the total luminous flux transmitted by said screen in the direction of the position to be occupied by said spectators, said second series of separate lens-shaped means being dimensioned and commonly directed to transmit a second and separate image beam which contains less than half of said total luminous flux in the direction of the position to be occupied by said operator.

2. A screen, as set forth in claim 1, wherein each of said separate lens-shaped means of said first series is so correlated with that of each of said separate lens-shaped means of said second series that the image transmitted by said first series fills a solid angle which is more than double the solid angle filled by the image transmitted by said second series.

3. A viewing screen for a cathode-ray projection tube television apparatus wherein the control members of the apparatus are positioned adjacent the screen on a cabinet housing the apparatus, said screen being constituted by a light permeable surface for transmitting light rays originating from the cathode-ray tube within the cabinet to an operator manipulating the controls on the cabinet as well as to spectators remote from the cabinet, said screen surface comprising a first series of separate lens-shaped means and a second series of lens-shaped means arranged alternately with respect to the first series, said first series of lens-shaped means being dimensioned and commonly directed to transmit a first image beam containing more than half the total luminous flux transmitted by said screen in the direction of the position to be occupied by said spectators, said second series of separate lens-shaped means being dimensioned and commonly directed to transmit a second and separate image beam containing less than half of said total luminous flux in the direction of the position to be occupied by said operator, each of said separate lens-shaped means of said first series being so correlated with that of each of said separate lens-shaped means of said second series that said image being transmitted by said first series fills a solid angle which is more than double the solid angle filled by said image being transmitted by said second series, the axis of the first beam being at an angle of more than 70° with said surface of said screen, and the axis of said second beam being at an angle less than 70° with said surface of said screen.

4. A screen as set forth in claim 3, wherein said second series of separate lens-shaped means comprises extensions from said surface possessing a substantially triangular cross-section.

5. A screen as set forth in claim 3, wherein said second series of separate lens-shaped means comprises indentations from said surface possessing a substantially triangular cross-section.

GERRIT JAN SIEZEN.

REFERENCES CITED

The following references are of record in the file of this patent:

UNITED STATES PATENTS

| Number | Name | Date |
| --- | --- | --- |
| 1,279,262 | Clark | Sept. 17, 1918 |
| 1,515,427 | Bouin | Nov. 11, 1924 |
| 1,544,782 | Stimson | July 7, 1925 |
| 1,943,995 | Weld | Jan. 16, 1934 |
| 1,944,187 | Marsat | Jan. 23, 1934 |
| 1,970,358 | Bull et al. | Aug. 14, 1934 |
| 2,058,707 | McGregor | Oct. 27, 1936 |
| 2,207,835 | Sukumlyn | July 16, 1940 |
| 2,268,351 | Tanaka | Dec. 30, 1941 |
| 2,271,196 | Kaszab | Jan. 27, 1942 |
| 2,326,042 | Lessman | Aug. 3, 1943 |
| 2,351,033 | Gabor | June 13, 1944 |